United States Patent
Thomas (10) Patent No.: US 6,766,096 B1
(45) Date of Patent: Jul. 20, 2004

(54) KIT FOR CONVERTING OPTICAL FIBER RETAINING CLIP

(76) Inventor: Lance P. Thomas, 8642 Crystal River Way, Sacramento, CA (US) 95828

( * ) Notice: Subject to any disclaimer, the term of this patent is extended or adjusted under 35 U.S.C. 154(b) by 19 days.

(21) Appl. No.: 10/335,171

(22) Filed: Dec. 31, 2002

(51) Int. Cl.[7] .................................................. G02B 6/00
(52) U.S. Cl. ....................................... 385/135; 385/136
(58) Field of Search ................................ 385/135, 136, 385/137, 134, 99

(56) References Cited

U.S. PATENT DOCUMENTS 4,715,251 A * 12/1987 Margolin et al. ............. 81/9.4
5,321,917 A * 6/1994 Franklin et al. ............ 451/386
5,793,921 A * 8/1998 Wilkins et al. ............. 385/135

* cited by examiner

Primary Examiner—Chandrika Prasad (57) ABSTRACT

A kit for converting an optical fiber retaining clip comprises, a tab shaver portion that has two parallel shaver blades for shaving off a retaining clip tab and a retaining clip threaded shoulder. A square hole punch portion has a rectangular blade for punching out a square hole section from the retaining clip. A notch cutter portion has a plurality of rotatable cutters for cutting a plurality of retaining notches into the retaining clip.

20 Claims, 5 Drawing Sheets

KIT FOR CONVERTING OPTICAL FIBER RETAINING CLIP

BACKGROUND OF THE INVENTION

1. Field of the Invention

The present invention relates to a kit for converting optical fiber retaining clip for use in connection with fiber optic conversion kits. The kit for converting optical fiber retaining clip has particular utility in connection with conversion kit for converting fiber optic retainer from biconic to subscription channel connector.

2. Description of the Prior Art

Kit for converting optical fiber retaining clips are desirable for converting older biconic connectors to modern subscription channel (SC) connectors a single connector at a time. This invention allows limited service interruption and the ability to use older biconic six pack connectors with newer SC connectors.

The use of fiber optic conversion kits is known in the prior art. For example, U.S. Pat. No. 4,715,251 to Margolin, et al discloses a fiber optic cable preparation tool of preparing fiber optic cable for termination with a fiber optic connector for cables of the type having a concentric arrangement, from the exterior of the center thereof, an outer protective cover, a layer of strength members and a buffer layered cover fiber. A longitudinally extending first member of the tool includes a longitudinal passage extending therethrough and the cable is mountable therein with a predetermined length extending from the front thereof. The front of the member is a frusto-conical shape on the exterior thereof and the cable is clamped within the member. A second clamp member also having a longitudinal passage therethrough is of a size such that the second clamp member can be received on the exterior of the frusto-conical end of the first member such as to hold strength members of the fiber optic cable securely against the outer surface of the frusto-conical end when the strength members are folded thereover. A sleeve press member then serves to force an inner sleeve which is mounted over the buffer covered end of the fiber into the region between the strength members and the buffered sleeve. The sleeve press member is of a predetermined length such that when engaged against the front end of the two previously described members, defines the length of fiber of the cable to be left with the buffer layer thereon so that the remaining fiber extending therefrom can have the buffer layer stripped. The disclosure also relates to a method of using the tool to prepare a fiber optic cable. However, the Margolin, et al. '251 patent does not have the ability to punch a square hole in an existing circular hole for receiving an SC connector, does not have an elongate shaft and spring loaded cutter element, and does not have an upstanding flange for receiving and positioning cable whereby a cutting element having pivotal rotating cutters is provided.

Similarly, U.S. Pat. No. 5,321,917 to Franklin, et al discloses a tool for finishing terminated fiber optic cable that is a fixture for positioning and holding fiber optic cables for polishing. The fixture includes a cable clamping mechanism consisting of a pair of links that are pivotally attached to movable portions of a nest that receives and holds the terminated end of the cable. A holding member is positioned above the nests to steady and hold the cables in rough position while the nest accurately positions the fiber optic end for polishing. A dovetail member is provided to accurately attach the fixture to the polishing machine. The fixture is arranged to not contact the abrasive material during polishing. However, the Franklin, et al. '917 patent does not have the ability to punch a square hole in an existing circular hole for receiving an SC connector, does not have an elongate shaft and spring loaded cutter element, and does not have an upstanding flange for receiving and positioning cable whereby a cutting element having pivotal rotating cutters is provided.

Lastly, U.S. Pat. No. 5,793,921 to Wilkins, et al discloses a kit for converting a conductive cable closure to a fiber optic cable closure that has two end plate assemblies, and a closure base and a closure cover attached to the end plate assemblies. An adapter is secured within a cable entrance port in the end plate assembly to alter the end plate opening to accommodate a fiber optic cable. The adapter restrains the cable sheath against axial forces and provides a seal between the optical fiber cable, the adapter and the end plate assembly. A bracket assembly is provided to anchor the optical fiber cable strength member to the end plate assembly. The closure provides a mounting bar secured to said end plate assemblies proximate the closure base and a mounting platform secured to the mounting bar. However, the Wilkins, et al. '921 patent does not have the ability to punch a square hole in an existing circular hole for receiving an SC connector, does not have an elongate shaft and spring loaded cutter element, and does not have an upstanding flange for receiving and positioning cable whereby a cutting element having pivotal rotating cutters is provided.

While the above-described devices fulfill their respective, particular objectives and requirements, the aforementioned patents do not describe a kit for converting optical fiber retaining clip that allows conversion kit for converting fiber optic retainer from biconic to subscription channel connector. The Margolin, et al. '251, Franklin, et al. '917 and Wilkins, et al. '921 patents make no provision for the ability to punch a square hole in an existing circular hole for receiving an SC connector, does not have an elongate shaft and spring loaded cutter element, and does not have an upstanding flange for receiving and positioning cable whereby a cutting element having pivotal rotating cutters is provided.

Therefore, a need exists for a new and improved kit for converting optical fiber retaining clip which can be used for conversion kit for converting fiber optic retainer from biconic to subscription channel connector. In this regard, the present invention substantially fulfills this need. In this respect, the kit for converting optical fiber retaining clip according to the present invention substantially departs from the conventional concepts and designs of the prior art, and in doing so provides an apparatus primarily developed for the purpose of conversion kit for converting fiber optic retainer from biconic to subscription channel connector.

SUMMARY OF THE INVENTION

In view of the foregoing disadvantages inherent in the known types of fiber optic conversion kits now present in the prior art, the present invention provides an improved kit for converting optical fiber retaining clip, and overcomes the above-mentioned disadvantages and drawbacks of the prior art. As such, the general purpose of the present invention, which will be described subsequently in greater detail, is to provide a new and improved kit for converting optical fiber retaining clip which has all the advantages of the prior art mentioned heretofore and many novel features that result in a kit for converting optical fiber retaining clip which is not anticipated, rendered obvious, suggested, or even implied by the prior art, either alone or in any combination thereof.

To attain this, the present invention essentially comprises a tab shaver portion that has two parallel shaver blades connected to a tab shaver handle that is slidably connected to a tab shaver retainer platform. The parallel shaver blades are for shaving off a retaining clip tab and a retaining clip threaded shoulder. A square hole punch portion has a rectangular blade connected to a square hole punch handle. The square hole punch handle is slidably connected to a square hole punch press platform. The rectangular blade is for punching out a square hole section from the retaining clip. A notch cutter portion has a plurality of rotatable cutters pivotally connected to a notch cutter platform. A notch cutter handle is slidably connected to a notch cutter platform. The rotatable cutters are for cutting a plurality of retaining notches into the retaining clip.

There has thus been outlined, rather broadly, the more important features of the invention in order that the detailed description thereof that follows may be better understood and in order that the present contribution to the art may be better appreciated.

The invention may also include a tab shaver grip, a tab shaver bias, a tab shave lip, a square hole punch grip, a square hole punch bias, a notch cutter grip and a notch cutter bias. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved kit for converting optical fiber retaining clip that has all of the advantages of the prior art fiber optic conversion kits and none of the disadvantages.

It is another object of the present invention to provide a new and improved kit for converting optical fiber retaining clip that may be easily and efficiently manufactured and marketed.

An even further object of the present invention is to provide a new and improved kit for converting optical fiber retaining clip that has a low cost of manufacture with regard to both materials and labor, and which accordingly is then susceptible of low prices of sale to the consuming public, thereby making such kit for converting optical fiber retaining clip economically available to the buying public.

Still another object of the present invention is to provide a new kit for converting optical fiber retaining clip that provides in the apparatuses s of the prior art some of the advantages thereof, while simultaneously overcoming some of the disadvantages normally associated therewith.

Lastly, it is an object of the present invention is to provide a kit for converting optical fiber retaining clip for conversion kit for converting fiber optic retainer from biconic to subscription channel connector.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1–11, a preferred embodiment of the kit for converting optical fiber retaining clip of the present invention is shown and generally designated by the reference numeral 10.

Figure 1:
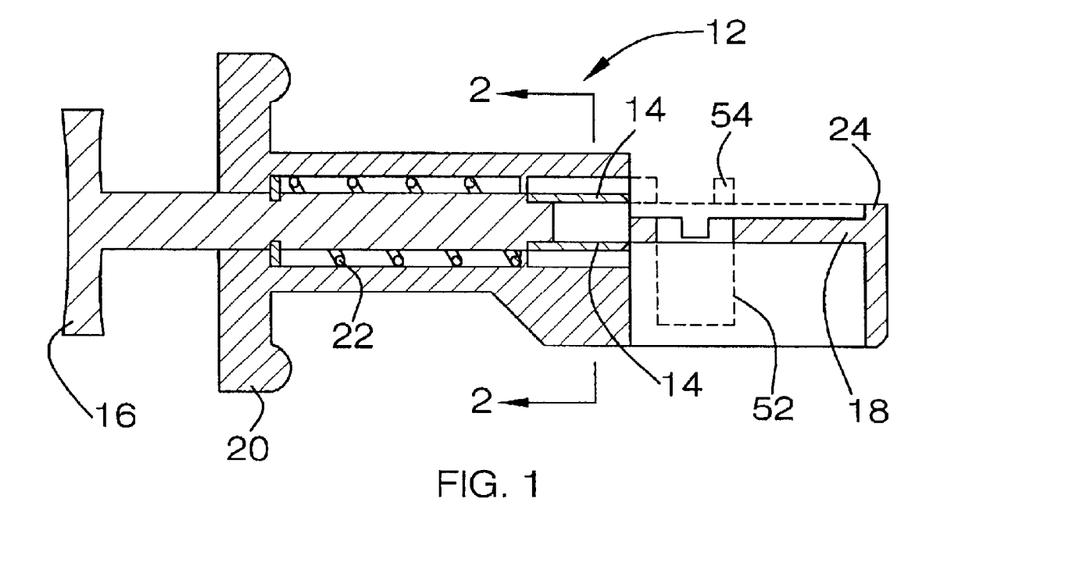
FIG. 1 is a section view of the tab shaver portion of preferred embodiment of the kit for converting optical fiber retaining clip constructed in accordance with the principles of the present invention.

In FIG. 1, a new and improved kit for converting optical fiber retaining clip 10 of the present invention for conversion kit for converting fiber optic retainer from biconic to subscription channel connector is illustrated and will be described. More particularly, the kit for converting optical fiber retaining clip 10 has a tab shaver portion 12 has thereon assembled a pair of shaver blades 14 connected to a tab shaver handle 16. The tab shaver handle 16 is slidably connected to a tab shaver retainer platform 18. The parallel shaver blades 14 are for shaving off a retaining clip tab 54 and a retaining clip threaded shoulder 52. A tab shaver grip 20 is connected to the tab shaver retainer platform 18. A tab shaver bias 22 is connected to the tab shaver retainer platform 18. The tab shaver bias 22 is connected to the tab shaver handle 16 for biasing the tab shaver handle 16. A tab shaver lip 24 is integrally connected to the tab shaver retainer platfomi 18.

Figures 2, 4, 5, 6:
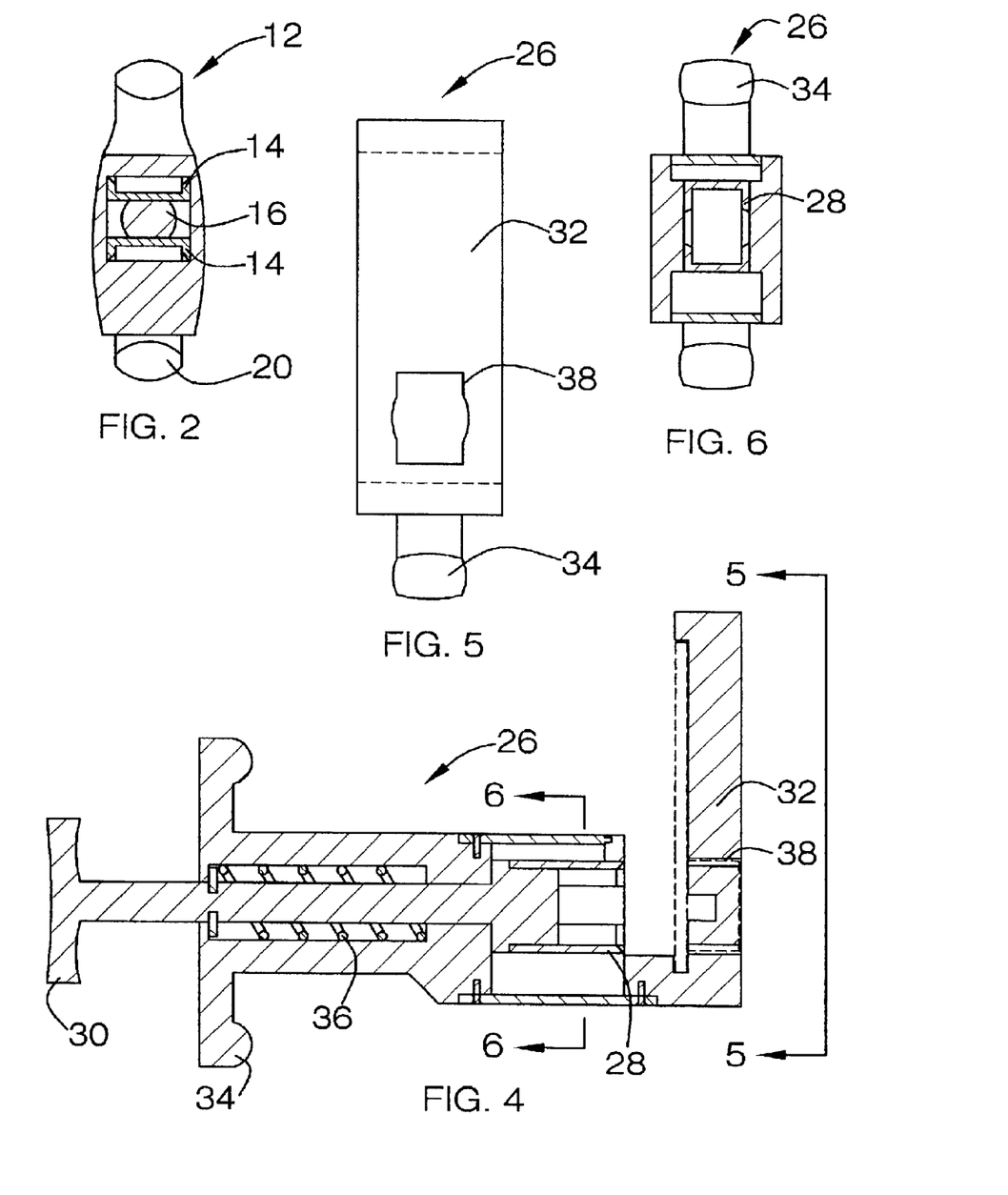
FIG. 2 is a section 2—2 view of FIG. 1 of the tab shaver portion of the kit for converting optical fiber retaining clip of the present invention.
FIG. 4 is a section view of the square hole punch portion of the kit for converting optical fiber retaining clip of the present invention.
FIG. 5 is a bottom side 5—5 view of FIG. 4 of the square hole punch portion of the kit for converting optical fiber retaining clip of the present invention.
FIG. 6 is a 6—6 section view of FIG. 4 of the square hole punch portion of the kit for converting optical fiber retaining clip of the present invention.

In FIG. 2, the kit for converting optical fiber retaining clip 10 is illustrated and will be described. The kit for converting optical fiber retaining clip 10 has the tab shaver portion 12 having thereon assembled two parallel shaver blades 14 connected to the tab shaver handle 16. The tab shaver grip 20 is connected to the tab shaver retainer platform 18.

Figure 3:
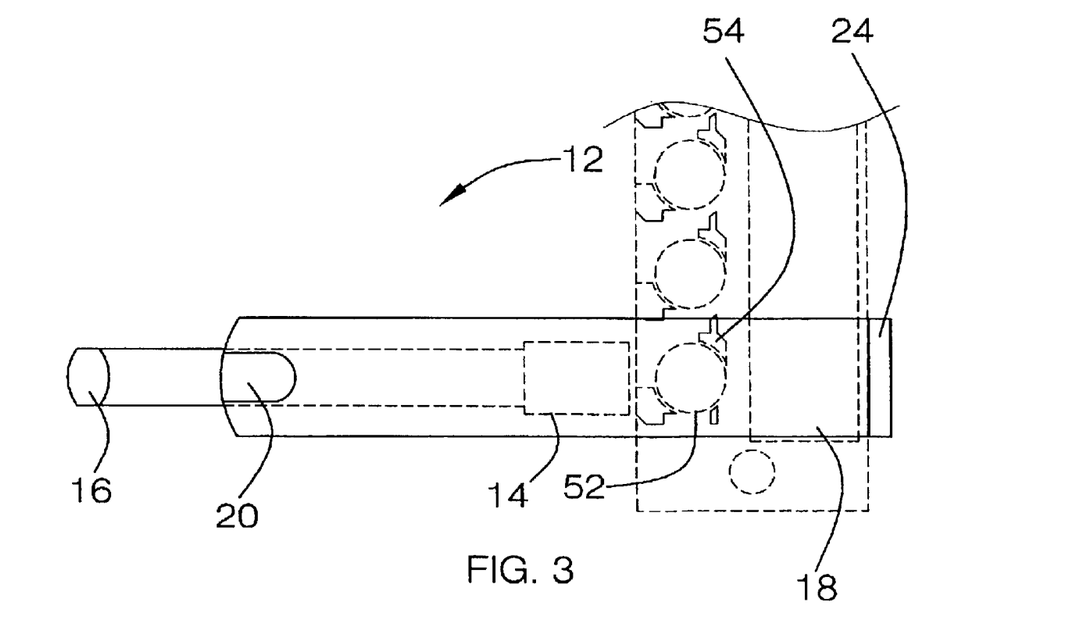
FIG. 3 is a left side view of the tab shaver portion of the kit for converting optical fiber retaining clip of the present invention.

In FIG. 3, the kit for converting optical fiber retaining clip 10 is illustrated and will be described. The kit for converting optical fiber retaining clip 10 has the tab shaver portion 12 having thereon assembled two parallel shaver blades 14 connected to the tab shaver handle 16. The tab shaver handle 16 is slidably connected to the tab shaver retainer platform 18. The parallel shaver blades 14 are for shaving off the retaining clip tab 54 and the retaining clip threaded shoulder 52. The tab shaver grip 20 is connected to the tab shaver retainer platform 18. The tab shaver lip 24 is integrally connected to the tab shaver retainer platform 18.

In FIG. 4, the kit for converting optical fiber retaining clip 10 is illustrated and will be described. The kit for converting optical fiber retaining clip 10 has a square hole punch portion 26 that has a rectangular blade 28 connected to a square hole punch handle 30. The square hole punch handle 30 is slidably connected to a square hole punch press platform 32. The rectangular blade 28 is for punching out a square hole section 58 (shown in FIG. 11) from the retaining clip. A square hole punch grip 34 is connected to the square hole punch press platform 32. A square hole punch bias 36 is connected to the square hole punch press platform 32. The square hole. punch bias 36 is connected to the square hole punch handle 30 for biasing the square hole punch handle 30. The square hole punch press platform 32 has a square hole therein 38.

In FIG. 5, the kit for converting optical fiber retaining clip 10 is illustrated and will be described. The square hole punch grip 34 is connected to the square hole punch press platform 32. The square hole punch press platform 32 has the square hole therein 38.

In FIG. 6, the kit for converting optical fiber retaining clip 10 is illustrated and will be described. The rectangular blade 28 is for punching out the square hole section 58 from the retaining clip. The square hole punch grip 34 is connected to the square hole punch press platform 32.

Figure 7:
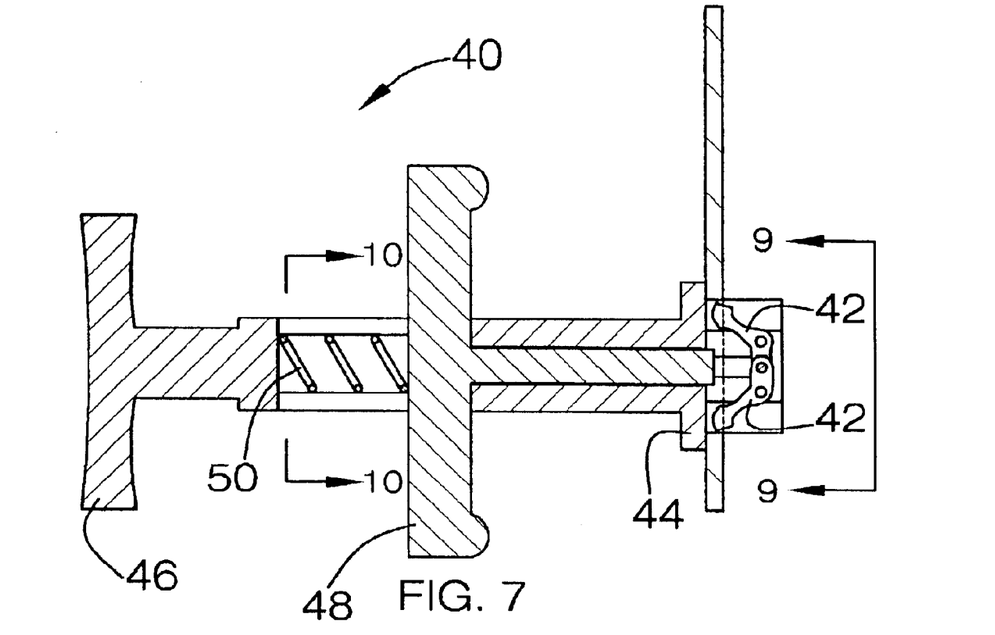
FIG. 7 is a section view of the notch cutter portion of the kit for converting optical fiber retaining clip of the present invention.

In FIG. 7, the kit for converting optical fiber retaining clip 10 is illustrated and will be described. The kit for converting optical fiber retaining clip 10 has a notch cutter portion 40 has a plurality of rotatable cutters 42 pivotally connected to a notch cutter platform 44. The plurality of rotatable cutters 42 are pivotally connected to a notch cutter grip 48. A notch cutter handle 46 is connected to the notch cutter platform 44.

The rotatable cutters 42 are for cutting a plurality of retaining notches 56 into the retaining clip. The notch cutter grip 48 is slidably connected to the notch cutter platform 44. A notch bias 50 is connected to the notch cutter platform 44. The notch bias 50 is connected to the notch cutter grip 48 for biasing the notch cutter grip 48.

Figure 8:
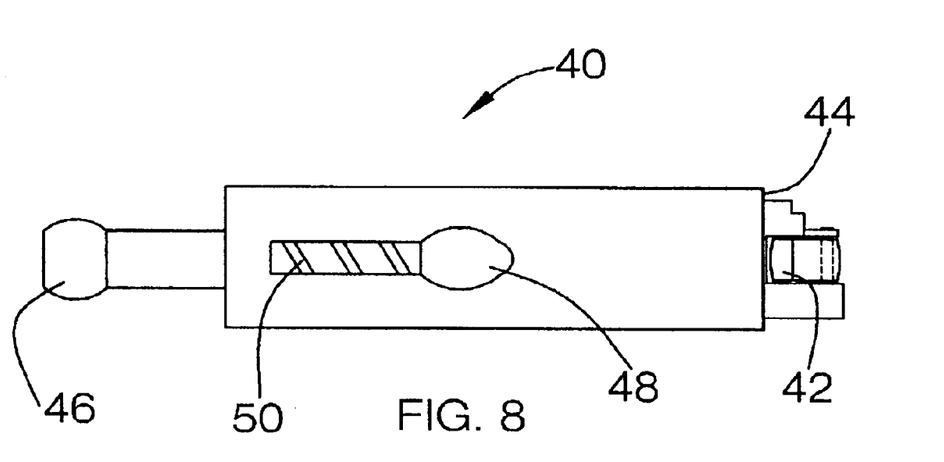
FIG. 8 is a left side view of the notch cutter portion of the kit for converting optical fiber retaining clip of the present invention.

In FIG. 8, the kit for converting optical fiber retaining clip 10 is illustrated and will be described. The kit for converting optical fiber retaining clip 10 has the notch cutter portion 40 has the plurality of rotatable cutters 42 pivotally connected to the notch cutter platform 44. The plurality of rotatable cutters 42 are pivotally connected to the notch cutter grip 48. The notch cutter handle 46 is connected to the notch cutter platform 44. The notch cutter grip 48 is slidably connected to the notch cutter platform 44.

Figure 9:
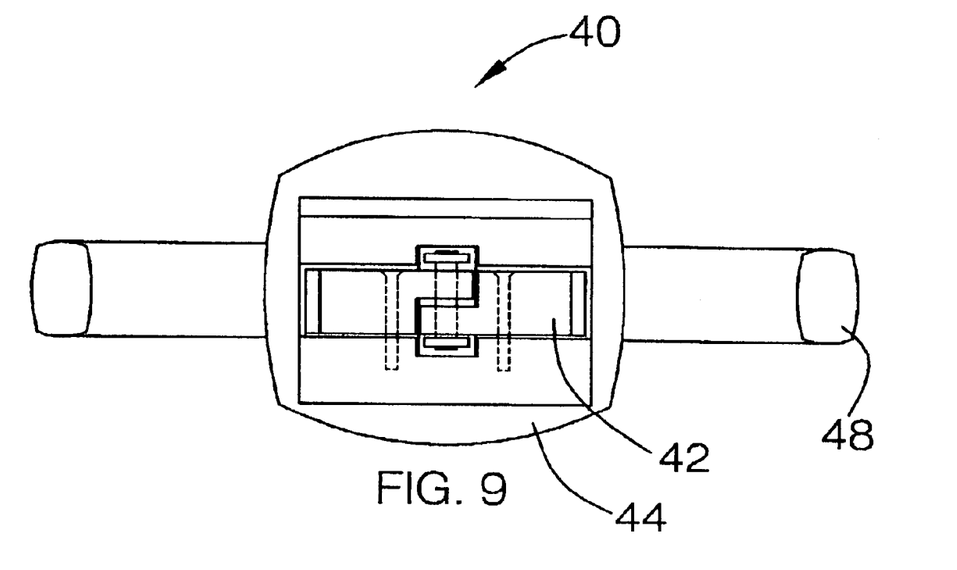
FIG. 9 is a bottom side 9—9 view of FIG. 7 of the notch cutter portion of the kit for converting optical fiber retaining clip of the present invention.

In FIG. 9, the kit for converting optical fiber retaining clip 10 is illustrated and will be described. The kit for converting optical fiber retaining clip 10 has the notch cutter portion 40 has the plurality of rotatable cutters 42 pivotally connected to the notch cutter platform 44. The plurality of rotatable cutters 42 are pivotally connected to the notch cutter grip 48. The notch cutter grip 48 is slidably connected to the notch cutter platform 44.

Figure 10:
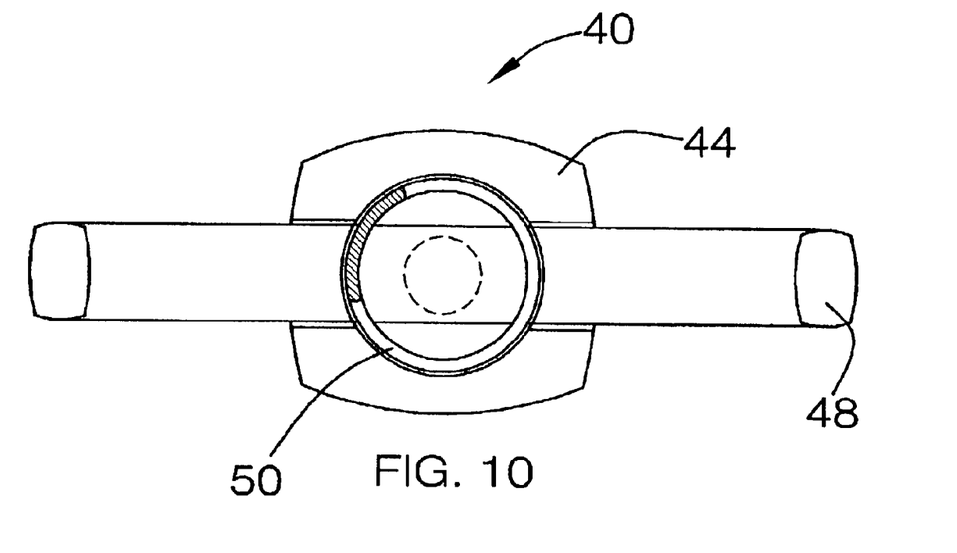
FIG. 10 is a section 10—10 view of FIG. 7 of the notch cutter portion of the kit for converting optical fiber retaining clip of the present invention.

In FIG. 10, the kit for converting optical fiber retaining clip 10 is illustrated and will be described. The notch cutter grip 48 is slidably connected to the notch cutter platform 44. The notch bias 50 is connected to the notch cutter platform 44. The notch bias 50 is connected to the notch cutter grip 48 for biasing the notch cutter grip 48.

Figure 11:
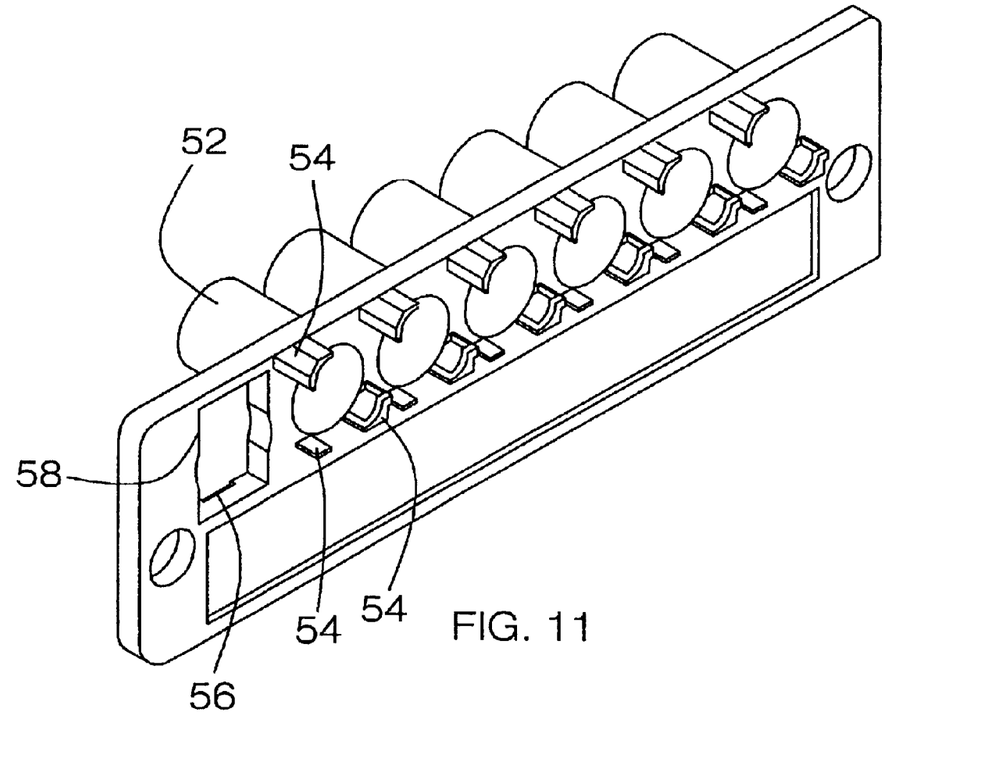
FIG. 11 is a top perspective view of a converted fiber optic retaining clip.

In FIG. 11, the kit for converting optical fiber retaining clip 10 is illustrated and will be described. The retaining clip is shown with one port converted from the biconic connector to the SC connector. The retaining clip square hole section 58 and retaining clip retaining notch 56 are shown.

In use it can now be understood that the retaining clip is first placed in the tab shaver portion 12 where the retaining clip threaded shoulder 52 and the retaining clip tabs 54 are cut off. The retaining clip is then placed in the square hole punch portion 26 where the square hole 58 the size of the SC connector is cut in the biconic retaining clip. The notch cutter 40 is then placed in the square hole 58 where the set of retaining clip retaining notches 56 are cut into the retaining clip.

While a preferred embodiment of the kit for converting optical fiber retaining clip has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic may be used instead of the metal described. And although conversion kit for converting fiber optic retainer from biconic to subscription channel connector have been described, it should be appreciated that the kit for converting optical fiber retaining clip herein described is also suitable for converting between many older types of optical fiber connectors to newer version connectors.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A kit for converting optical fiber retaining clip comprising, in combination:
   a tab shaver portion having thereon assembled two parallel shaver blades connected to a tab shaver handle, said tab shave handle slidably connected to a tab shaver retainer platform, said parallel shaver blades for shaving off a retaining clip tab and a retaining clip threaded shoulder; and
   a square hole punch portion having thereon assembled a rectangular blade connected to a square hole punch handle, said square hole punch handle slidably connected to a square hole punch press platform, said rectangular blade for punching out a square hole section from said retaining clip.

2. The kit for converting optical fiber retaining clip of claim 1 further comprising:
   a notch cutter portion having thereon assembled a plurality of rotatable cutters pivotally connected to a notch cutter platform, said plurality of rotatable cutters pivotally connected to a notch cutter grip, a notch cutter handle connected to a notch cutter platform, said rotatable cutters for cutting a plurality of retaining notches into said retaining clip.

3. The kit for converting optical fiber retaining clip of claim 1 further comprising:
   a tab shaver grip connected to said tab shaver retainer platform.

4. The kit for converting optical fiber retaining clip of claim 1 further comprising:
   a tab shaver bias connected to said tab shaver retainer platform, said tab shaver bias connected to said tab shaver handle for biasing said tab shaver handle.

5. The kit for converting optical fiber retaining clip of claim 1 further comprising:
   a tab shaver lip integrally connected to said tab shaver retainer platform.

6. The kit for converting optical fiber retaining clip of claim 1 further comprising:
   a square hole punch grip connected to said square hole punch press platform.

7. The kit for converting optical fiber retaining clip of claim 1 further comprising:
   a square hole punch bias connected to said square hole punch press platform, said square hole punch bias connected to said square hole punch handle for biasing said square hole punch handle.

8. The kit for converting optical fiber retaining clip of claim 1 wherein:
   said square hole punch press platform has a square hole therein.

9. The kit for converting optical fiber retaining clip of claim 2 further comprising:
   a notch cutter grip slidably connected to said notch cutter platform.

10. The kit for converting optical fiber retaining clip of claim 2 further comprising:
    a notch bias connected to said notch cutter platform, said notch cutter bias connected to said notch cutter grip for biasing said notch cutter grip.

11. A kit for converting optical fiber retaining clip comprising, in combination:
    a tab shaver portion having thereon assembled two parallel shaver blades connected to a tab shaver handle, said tab shave handle slidably connected to a tab shaver retainer platform, said parallel shaver blades for shaving off a retaining clip tab and a retaining clip threaded shoulder;
    a square hole punch portion having thereon assembled a rectangular blade connected to a square hole punch handle, said square hole punch handle slidably connected to a square hole punch press platform, said rectangular blade for punching out a square hole section from said retaining clip; and
    a notch cutter portion having thereon assembled a plurality of rotatable cutters pivotally connected to a notch cutter platform, said plurality of rotatable cutters pivotally connected to a notch cutter grip, a notch cutter handle connected to a notch cutter platform, said rotatable cutters for cutting a plurality of retaining notches into said retaining clip.

12. The kit for converting optical fiber retaining clip of claim 11 further comprising:
    a tab shaver grip connected to said tab shaver retainer platform.

13. The kit for converting optical fiber retaining clip of claim 11 further comprising:
    a tab shaver bias connected to said tab shaver retainer platform, said tab shaver bias connected to said tab shaver handle for biasing said tab shaver handle.

14. The kit for converting optical fiber retaining clip of claim 11 further comprising:
    a tab shaver lip integrally connected to said tab shaver retainer platform.

15. The kit for converting optical fiber retaining clip of claim 11 further comprising:
    a square hole punch grip connected to said square hole punch press platform.

16. The kit for converting optical fiber retaining clip of claim 11 further comprising:
    a square hole punch bias connected to said square hole punch press platform, said square hole punch bias connected to said square hole punch handle for biasing said square hole punch handle.

17. The kit for converting optical fiber retaining clip of claim 11 wherein:
    said square hole punch press platform has a square hole therein.

18. The kit for converting optical fiber retaining clip of claim 11 further comprising:
    a notch cutter grip slidably connected to said notch cutter platform.

19. The kit for converting optical fiber retaining clip of claim 11 further comprising:
    a notch bias connected to said notch cutter platform, said notch cutter bias connected to said notch cutter grip for biasing said notch cutter grip.

20. A kit for converting optical fiber retaining clip comprising, in combination:
    a tab shaver portion having thereon assembled two parallel shaver blades connected to a tab shaver handle, said tab shave handle slidably connected to a tab shaver retainer platform, said parallel shaver blades for shaving off a retaining clip tab and a retaining clip threaded shoulder, a tab shaver grip connected to said tab shaver retainer platform, a tab shaver bias connected to said tab shaver retainer platform, said tab shaver bias connected to said tab shaver handle for biasing said tab shaver handle, a tab shaver lip integrally connected to said tab shaver retainer platform;

a square hole punch portion having thereon assembled a rectangular blade connected to a square hole punch handle, said square hole punch handle slidably connected to a square hole punch press platform, said rectangular blade for punching out a square hole section from said retaining clip, a square hole punch grip connected to said square hole punch press platform, a square hole punch bias connected to said square hole punch press platform, said square hole punch bias connected to said square hole punch handle for biasing said square hole punch handle, said square hole punch press platform having a square hole therein; and a notch cutter portion having thereon assembled a plurality of rotatable cutters pivotally connected to a notch cutter platform, said plurality of rotatable cutters pivotally connected to a notch cutter grip, a notch cutter handle connected to a notch cutter platform, said rotatable cutters for cutting a plurality of retaining notches into said retaining clip, a notch cutter grip slidably connected to said notch cutter platform, a notch bias connected to said notch cutter platform, said notch cutter bias connected to said notch cutter grip for biasing said notch cutter grip.

* * * * *